United States Patent
Okada et al.

(10) Patent No.: US 10,102,436 B2
(45) Date of Patent: Oct. 16, 2018

(54) IMAGE PROCESSING DEVICE, WARNING DEVICE AND METHOD FOR PROCESSING IMAGE

(71) Applicant: KYOCERA Corporation, Kyoto (JP)

(72) Inventors: Takahiro Okada, Yokohama (JP); Takatoshi Nakata, Yokohama (JP)

(73) Assignee: KYOCERA Corporation, Kyoto (JP)

(*) Notice: Subject to any disclaimer, the term of this patent is extended or adjusted under 35 U.S.C. 154(b) by 156 days.

(21) Appl. No.: 15/107,877

(22) PCT Filed: Dec. 24, 2014

(86) PCT No.: PCT/JP2014/006443
§ 371 (c)(1),
(2) Date: Jun. 23, 2016

(87) PCT Pub. No.: WO2015/098107
PCT Pub. Date: Jul. 2, 2015

(65) Prior Publication Data
US 2016/0321509 A1    Nov. 3, 2016

(30) Foreign Application Priority Data
Dec. 24, 2013 (JP) ................. 2013-266025

(51) Int. Cl.
*G06K 9/00* (2006.01)
*H04N 5/243* (2006.01)
(Continued)

(52) U.S. Cl.
CPC ............ *G06K 9/00805* (2013.01); *B60R 1/00* (2013.01); *G06K 9/6267* (2013.01);
(Continued)

(58) Field of Classification Search
CPC .... G06K 9/00805; G06K 9/6267; G06T 7/13; G06T 3/4038; G06T 5/00; H04N 5/23293;
(Continued)

(56) References Cited

U.S. PATENT DOCUMENTS 7,139,412 B2   11/2006   Kato et al.
8,243,994 B2    8/2012   Suzuki et al.
(Continued)

FOREIGN PATENT DOCUMENTS

EP   2018066 A1   1/2009
JP   2002-324235 A   11/2002
(Continued)

OTHER PUBLICATIONS

The Extended European Search Report issued by the European Patent Office dated Jun. 1, 2017, which corresponds to European Patent Application No. 14873599.6-1906 and is related to U.S. Appl. No. 15/107,877.
(Continued)

Primary Examiner — Michael Teitelbaum
(74) Attorney, Agent, or Firm — Studebaker & Brackett PC

(57) ABSTRACT

There is provided an image processing device capable of recognizing a presence of an object with low visibility on a combined image, a warning device and a method for processing an image. The image processing device includes an image acquiring unit configured to acquire a first image capturing an area around a mobile object including a first area and a second image capturing an area around the mobile object including a second area adjacent to the first area; a contour detector configured to perform a contour detection to the first and second images; and a determiner configured to detect, if a first contour detected on the first image extends
(Continued)

to a boundary with the second image on a combined image including at least a part of the first image and at least a part of the second image, whether or not a second contour is detected on an extension of the first contour on the second image.

9 Claims, 13 Drawing Sheets

(51) Int. Cl.
| | | |
|---|---|---|
| G06T 3/40 | (2006.01) | |
| B60R 1/00 | (2006.01) | |
| G06K 9/62 | (2006.01) | |
| G06T 7/13 | (2017.01) | |
| G06T 5/00 | (2006.01) | |
| H04N 5/232 | (2006.01) | |

(52) U.S. Cl.
CPC .............. *G06T 3/4038* (2013.01); *G06T 5/00* (2013.01); *G06T 7/13* (2017.01); *H04N 5/23293* (2013.01); *H04N 5/243* (2013.01); *B60R 2300/00* (2013.01); *B60R 2300/304* (2013.01); *B60R 2300/8093* (2013.01)

(58) Field of Classification Search
CPC ...... H04N 5/243; B60R 1/00; B60R 2300/00; B60R 2300/304; B60R 2300/809
See application file for complete search history.

(56) References Cited

U.S. PATENT DOCUMENTS

| 8,350,923 B2 | 1/2013 | Nakayama et al. |
| 2002/0196340 A1 | 12/2002 | Kato et al. |
| 2007/0177815 A1 | 8/2007 | Yang et al. |
| 2007/0285282 A1 | 12/2007 | Nakayama et al. |
| 2009/0257659 A1 | 10/2009 | Suzuki et al. |
| 2012/0307047 A1 | 12/2012 | Kawashima et al. |

FOREIGN PATENT DOCUMENTS

| JP | 2007-324887 A | 12/2007 |
| JP | 2010-166196 A | 7/2010 |
| WO | 2007/129582 A1 | 11/2007 |

OTHER PUBLICATIONS

Richard Szeliski, "Image Alignment and Stitching: A tutorial", Foundations and Trends in Computer Graphics and Vision, vol. 2, No. 1, Jan. 1, 2006, pp. 1-104, XP055227915, US ISSN: 1572-2740, DOI: 10.1561/0600000009.

International Search Report issued in PCT/JP2014/006443; dated Mar. 31, 2015.

Written Opinion issued in PCT/JP2014/006443; dated Mar. 31, 2015; with English language Concise Explanation.

IMAGE PROCESSING DEVICE, WARNING DEVICE AND METHOD FOR PROCESSING IMAGE

CROSS-REFERENCE TO RELATED APPLICATION

This application claims priority to and the benefit of Japanese Patent Application No. 2013-266025 filed on Dec. 24, 2013 and PCT Application No. PCT/JP2014/006443 filed on Dec. 24, 2014, the entire contents of which are incorporated herein by reference.

TECHNICAL FIELD

This disclosure relates to an image processing device that improves the recognizability of an object on a screen, a warning device and a method for processing an image.

BACKGROUND

An around view monitor system is known in which a plurality of onboard cameras are mounted on a mobile object such as a car to capture images of the area around the mobile object, and by use of a plurality of generated images, a combined image that provides a bird's eye view of the area around the mobile object is displayed. In such a system, a technique by which a visual continuity is provided to each seam between captured images is known (for example, PTL 1).

CITATION LIST

Patent Literature

PTL1: JP2010-166196 (A)

SUMMARY

Technical Problem

In order to ensure the visibility of an image, in general, the color and brightness of an image is adjusted by each camera using gamma correction, white balance and exposure control, or the like. Therefore, for example, in the night or indoors, due to the influence of lights of a mobile object that illuminate a portion of the area around the mobile object or light sources around the mobile object, an object such as an obstacle captured brightly with an camera was sometimes captured darkly with another camera. As described above, in some cases, the presence of an object with a low visibility was not recognized on a combined image due to various light sources around the mobile object.

It would therefore be helpful to provide an image processing device that can recognize the presence of an object with low visibility on a combined image, a warning device and a method for processing an image.

Solution to Problem

A disclosed image processing device includes:
an image acquiring unit configured to acquire a first mage capturing an area around a mobile object including a first area and a second image capturing an area around the mobile object including a second area adjacent to the first area;
a contour detector configured to perform a contour detection to the first and second images; and
a determiner configured to determine, if a first contour detected on the first image extends to a boundary with the second image on a combined image including at least a part of the first image and at least a part of the second image, whether or not a second contour is detected on an extension of the first contour on the second image.

The disclosed image processing device may preferably further include an adjuster configured to make an adjustment to increase a contrast of the second image if the determiner determines that the second contour is not detected on the second image.

In the disclosed image processing device, the adjustment may preferably be made by at least one of brightness correction, color correction, and contour correction of the second image, exposure control when capturing and gain control when capturing.

In the disclosed image processing device, the image acquiring unit may preferably acquire information indicating a first gain set in a first image capturing unit that captures the first image and information indicating a second gain set in a second image capturing unit that captures the second image; and
if a difference between the first gain and the second gain is a threshold or more, the adjuster may preferably perform at least one of giving a warning to a driver and setting the second gain that has been changed in conformity to the first gain in the second image capturing unit.

The disclosed image processing device may preferably further include a drawing unit configured to draw a superimposed line at a position on the second image that corresponds to the extension of the first contour if the determiner determines that the second contour is not detected on the second image.

The disclosed image processing device may preferably further include a drawing unit configured to define a position on the second image that corresponds to the extension of the first contour as a boundary line if the determiner determines that the second contour is not detected on the second image, and to superimpose, on at least one area of areas on the second image divided by the boundary line, a color that is different from a color of the area.

A disclosed warning device includes:
an image acquiring unit configured to acquire a first image capturing an area around a mobile object including a first area and a second image capturing an area around the mobile object including a second area adjacent to the first area;
a contour detector configured to perform a contour detection to the first and second images;
a determiner configured to determine, if a first contour detected on the first image extends to a boundary with the second image on a combined image including at least a part of the first image and at least a part of the second image, whether or not a second contour is detected on an extension of the first contour on the second image; and
a warning generator configured to give a warning indicating that an obstacle is present if the determiner determines that the second contour is not detected on the second image.

The disclosed warning device may preferably further include an adjuster configured to make an adjustment to increase a contrast of the second image if the determiner determines that the second contour is not detected on the second image.

In the disclosed warning device, the adjustment may preferably be made by at least one of brightness correction, color correction and contour correction of the second image, exposure control when capturing and gain control when capturing.

In the disclosed warning device, the image acquiring unit may preferably acquire information indicating a first gain set in a first image capturing unit that captures the first image and information indicating a second gain set in a second image capturing unit that captures the second image; and if a difference between the first gain and the second gain is a threshold or more, the adjuster may preferably perform at least one of giving a warning to a driver and setting the second gain that has been changed in conformity to the first gain in the second image capturing unit.

The disclosed warning device may preferably further include a drawing unit configured to draw a superimposed line at a position on the second image that corresponds to the extension of the first contour if the determiner determines that the second contour is not detected on the second image.

The disclosed warning device may preferably further include a drawing unit configured to define a position on the second image that corresponds to the extension of the first contour as a boundary line if the determiner determines that the second contour is not detected on the second image, and to superimpose, on at least one area of areas on the second image divided by the boundary line, a color that is different from a color of the area.

A disclosed method for processing an image includes the steps of:

acquiring a first image capturing an area around a mobile object including a first area and a second image capturing an area around the mobile object including a second area adjacent to the first area;

performing a contour detection to the first and second images; and determining, if a first contour detected on the first image extends to a boundary with the second image on a combined image generated by using the first and second images, whether or not a second contour is detected on an extension of the first contour on the second image.

Advantageous Effect

According to the disclosed image processing device, warning device and method for processing an image, an image can be captured with an improved visibility, and as a result, the presence of an object with a low visibility can be recognized on a combined image.

DETAILED DESCRIPTION

The following describes embodiments of this disclosure with reference to the drawings.

(First Embodiment)

Figure 1:
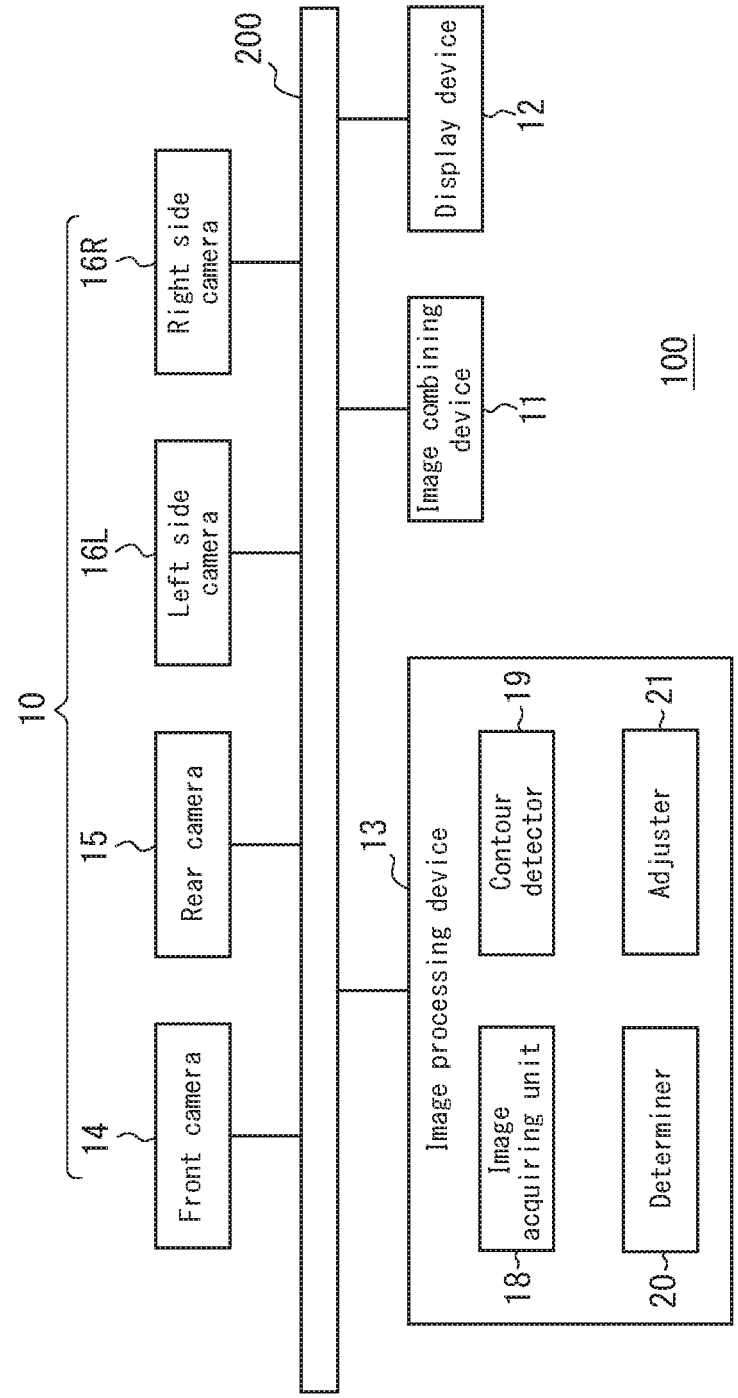
FIG. 1 is a functional block diagram illustrating a schematic configuration of a camera system according to a first embodiment of this disclosure.

First, a camera system including an image processing device according to a first embodiment of this disclosure is described. FIG. 1 is a functional block diagram illustrating a schematic configuration of the camera system according to the first embodiment of this disclosure.

As illustrated in FIG. 1, a camera system 100 includes an image capturing device 10, an image combining device 11, a display device 12 and an image processing device 13. The image capturing device 10, the image combining device 11, the display device 12 and the image processing device 13 can communicate with each other over a car-mounted network 200. The image capturing device 10 has a plurality of image capturing units, such as, for example, a front camera 14, a rear camera 15 and side cameras (a left side camera 16L and a right side camera 16R) in this embodiment.

The front camera 14 includes a lens having a wide angle of view such as a fish-eye lens, and allows for a wide angle photography. The front camera 14 is disposed on a mobile object 17 so that it can capture an image of the area around the mobile object 17 including the front area FA (see FIG. 2). The front camera 14 also performs photometry in the photometry area FP in the middle of the front area FA, and performs an exposure control and a gain control. The front camera 14 also periodically captures an object image at 30 fps, for example, to generate a captured image. Furthermore, the front camera 14 applies the general image processing such as white balance, gamma correction, or the like, to a captured image. The operation of the front camera 14 is controlled based on the setting relating to image capture. The setting relating to image capture includes, for example, setting of a f-measure and a shutter speed of an optical system in the exposure control, and setting of a gain to be multiplied to an image signal in the gain control, gamma correction and white balance. The front camera 14 also applies the image conversion processing to a captured image to convert an image into a bird's eye image of the front area FA of the mobile object 17. That is, by the image conversion, a captured image that is generated by a wide-angle shot and generally has a distortion around the image is converted into a bird's eye image of the front area FA which is viewed vertically downward from above the mobile object 17.

The rear camera 15, the left side camera 16L and the right side camera 16R (see FIG. 1) are configured in the same way as the front camera 14.

Figure 2:
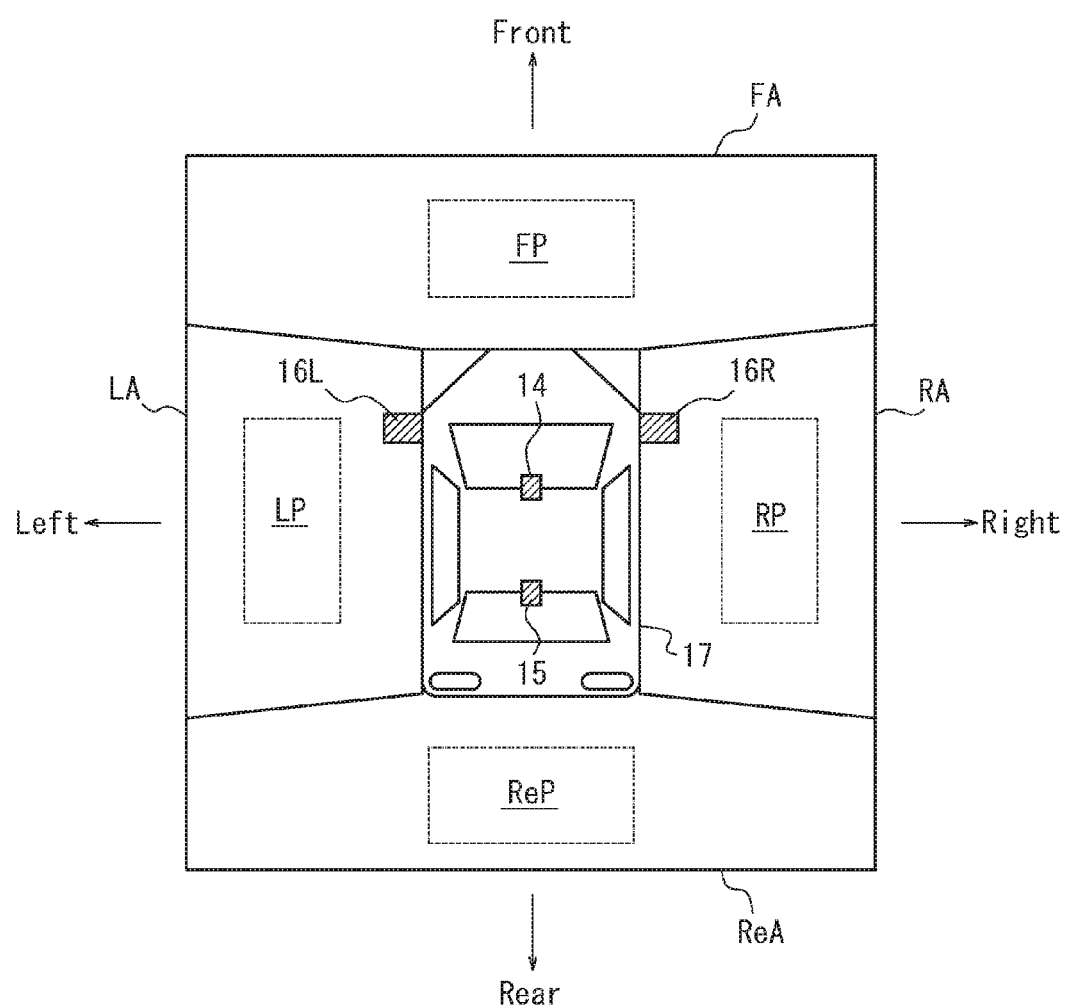
FIG. 2 is a schematic diagram illustrating an image capturing range of an image capturing device in FIG. 1.

For example, the rear camera 15 is disposed on the mobile object 17 so that it can capture an image of the area around the mobile object 17 including the rear area ReA (see FIG. 2). The rear camera 15 also performs photometry in the photometry area ReP in the middle of the rear area ReA and performs the exposure control and the gain control to generate a captured image. Furthermore, the rear camera 15 applies the common image processing to a captured image, and converts the captured image into a bird's eye image of the rear area ReA by the image conversion.

For example, the left side camera 16L is disposed vertically downward at the door mirror on the left side of the mobile object 17 so that it can capture an image of the area around the mobile object 17 including the left side area LA. The left side camera 16L also performs photometry in the photometry area LP in the middle of the left side area LA, and performs the exposure control and the gain control to generate a captured image. Furthermore, the left side camera 16L applies the common image processing to a captured image, and converts the captured image into a bird's eye image of the left side area LA by the image conversion.

For example, the right side camera 16R is disposed vertically downward at the door mirror on the right side of the mobile object 17 so that it can capture an image of the area around the mobile object 17 including the right side area RA. The right side camera 16R also performs photometry in the photometry area RP in the middle of the right side area RA, and performs the exposure control and the gain control to generate a captured image. Furthermore, the right side camera 16R applies the common image processing to a captured image, and converts the captured image into a bird's eye image of the right side area RA by the image conversion.

The above described areas FA, ReA, LA and RA are annularly adjacent each other. For example, the front area FA is adjacent to the left side area LA and the right side area RA.

The image combining device 11 (see FIG. 1) combines a plurality of bird's eye images generated respectively by the front camera 14, the rear camera 15 and the side cameras 16L and 16R, or a plurality of bird's eye images generated by the image processing device 13 described below to generate a combined image. The combined image is, for example, a bird's eye image of all around the mobile object 17. For a combined image, an image of the front camera 14, an image of the rear camera 15, an image of the left side camera 16L, and an image of the right side camera 16R are used for the front area FA, the rear area ReA, the left side area LA and the right side area RA, respectively (see FIG. 2).

The display device 12 is an LCD, for example, and can display a moving image in real-time. The display device 12 acquires a combined image generated by the image combining device 11 and displays the image. The display device 12 is configured by a touch panel, for example, and may function as an interface that accepts the user operation.

The image processing device 13 has an image acquiring unit 18, a contour detector 19, a determiner 20 and an adjuster 21.

The image acquiring unit 18 acquires an image each generated by the front camera 14, the rear camera 15 and the side cameras 16L and 16R as an image signal. An image signal includes a brightness signal and a color signal. In this embodiment, although the image acquiring unit 18 acquires a bird's eye image generated by the front camera 14, the rear camera 15 and the side cameras 16L and 16R, it may acquire a captured image to which the image conversion processing is not applied yet.

The contour detector 19 performs the contour detection processing to a plurality of images acquired from the front camera 14, the rear camera 15 and the side cameras 16L and 16R. That is, a contour (contour line) of an object on an image is detected by the contour detection. In the contour detection processing of this disclosure, on a plurality of continuous pixels, points where a difference (contrast) in the image signal intensity is a predetermined value, th, or more are detected as a contour. The predetermined value, th, is a value of the contrast indicating the standard of easy visibility of a contour on an image by a driver, and can be determined by, for example, experiments or simulations. The contour having a contrast of the predetermined value, th, or more can be viewed easily by a driver. On the other hand, the contour having a contrast of less than the predetermined value, th, is not easy for the driver to view. The contour detector 19 may detect a contour based on any threshold that is less than the predetermined value, th, as a standard.

The determiner 20 determines whether or not a first contour that is detected on one (a first image) of a plurality of images acquired from the front camera 14, the rear camera 15 and the side cameras 16L and 16R and has a contrast of the predetermined value, th, or more extends to a boundary with another image (a second image) adjacent to the first image on a combined image. If the first contour extends to the boundary, the determiner 20 determines whether or not a second contour that corresponds to the extension of the first contour and has a contrast of the predetermined value, th, or more is detected on the second image. Specific operation of the determiner 20 is described below.

If the second contour having a contrast of the predetermined value, th, or more is not detected, the adjuster 21 makes an adjustment to increase a contrast of the second image. A contrast can be adjusted by, for example, brightness correction, color correction, contour correction and gamma correction of an image, an exposure control when capturing and a gain control when capturing. In greater detail, the adjuster 21 applies the image processing such as brightness correction, color correction and contour correction to the acquired second image and outputs the image to the image combining device 11. Alternatively, the adjuster 21 controls an operation of exposure control, gain control and image processing performed by the image capturing unit (14, 15, 16L and 16R) when capturing a second image on the next and subsequent frames. The adjuster 21 may preferably perform the above described processing for increasing a contrast of the second image repeatedly until a contrast at the position on a second image that corresponds to an extension of the first contour becomes the predetermined value, th, or more. For example, the image processing applied by the adjuster 21 to a second image and the contour detection processing applied by the contour detector 19 to a second image to which the image processing has been applied are executed repeatedly until the determiner 20 detects a second contour having a contrast of the predetermined value, th, or more.

Figure 3:
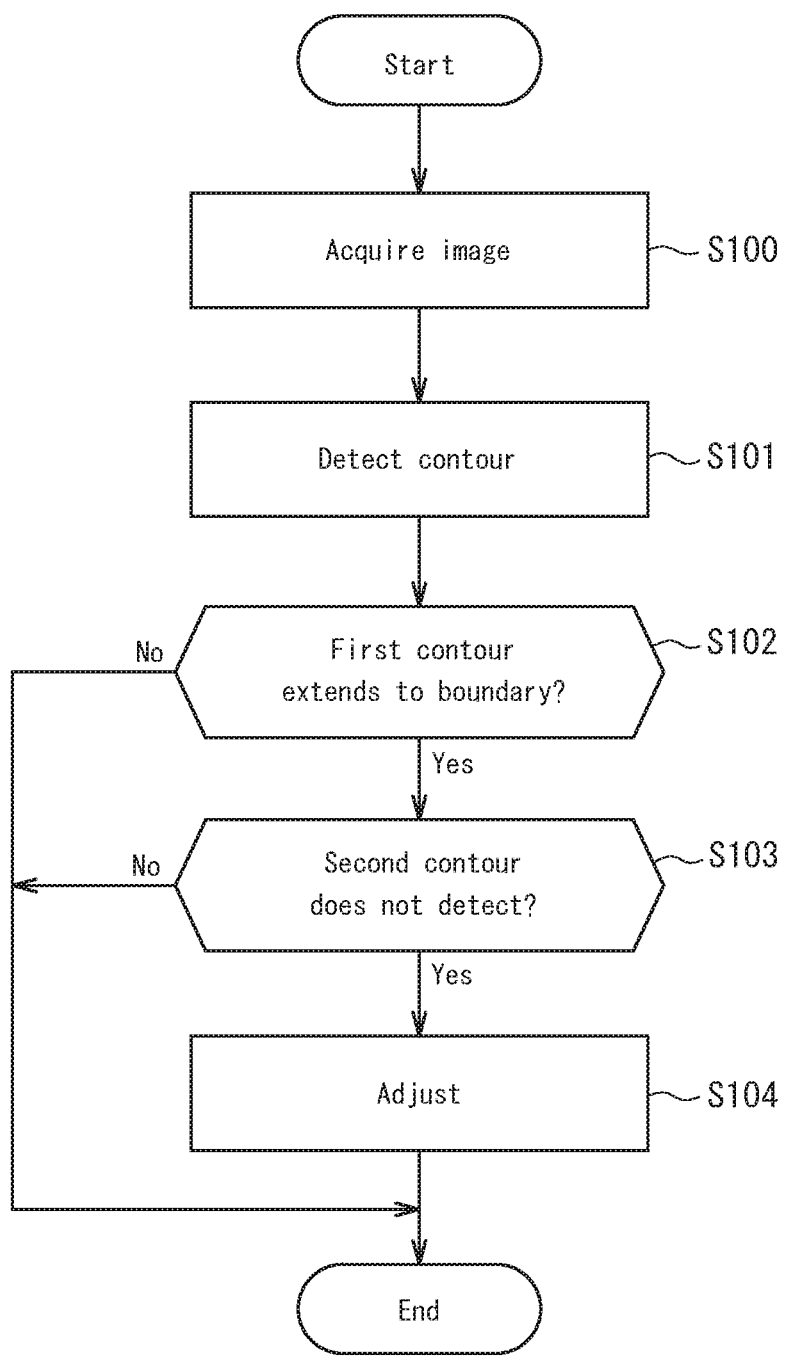
FIG. 3 is a flow chart illustrating an operation of an image processing device in FIG. 1.

Next, the operation executed by the image processing device 13 according to the first embodiment is described using the flow chart in FIG. 3.

First, in step S100, the image acquiring unit 18 acquires an image (a bird's eye image) from the front camera 14, the rear camera 15 and the side cameras 16L and 16R, respectively.

Next, in step S101, the contour detector 19 performs a contour detection to each image acquired at step S100.

Next, in step S102, the determiner 20 determines whether or not the first contour detected on the first image among a plurality of images to which a contour detection has been performed at step S101 extends to a boundary with the adjacent second image. If the first contour does not extend to the boundary (No at step S102), the processing is terminated.

On the other hand, at step S102, if the first contour extends to the boundary (Yes at step S102), in step S103, the determiner 20 determines whether or not the second contour that corresponds to the extension of the first contour and has a contrast of the predetermined value, th, or more is detected on the second image. If the second contour is detected (No at step S103), the processing is terminated.

On the other hand, if the second contour is not detected at step S103 (Yes at step S103), in step S104, the adjuster 21 makes an adjustment to increase a contrast of the second image.

The above described steps S102 through S104 are performed to all combinations of images that can be adopted as the first and second images. In greater detail, in each case where an image by the front camera 14, an image by the rear camera 15, an image by the left side camera 16L or an image by the right side camera 16R are defined respectively as a first image, each of the two images adjacent to the first image is defined as a second image, and the above described processing is executed.

Thus, the image processing device 13 according to the first embodiment determines whether or not a second contour that corresponds to an extension of the first contour and has a contrast of the predetermined value, th, or more is detected on the second image. As a result of this, a presence of an object on a combined image can be recognized.

Figure 4:
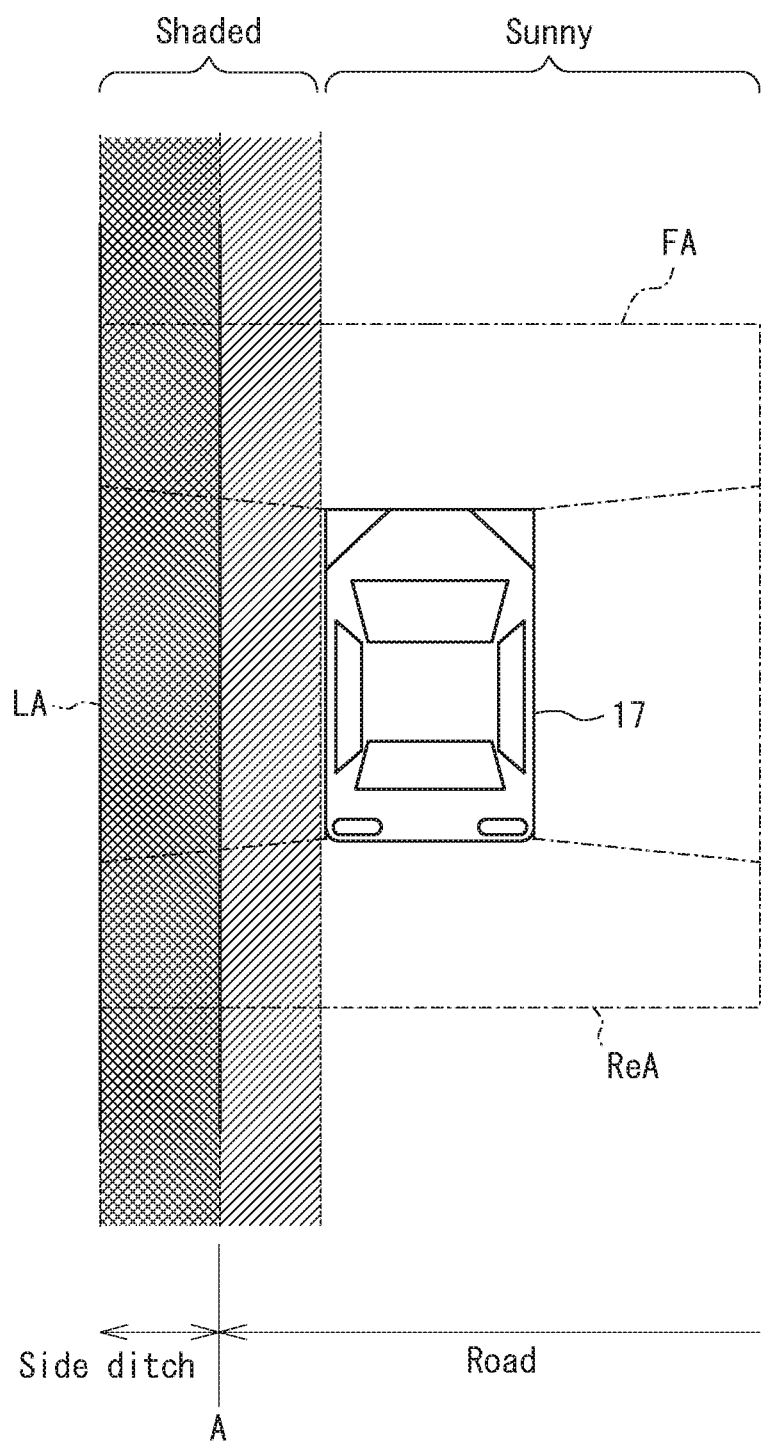
FIG. 4 is a diagram illustrating the situation around a mobile object.

An operation of the image processing device 13 according to the first embodiment is described in detail below. As illustrated in FIG. 4, in the area around the mobile object 17 on the road, regarding the case where the left side of the mobile object 17 is shaded and there exists a side ditch (an object) that is spaced apart from the mobile object 17 and extends along the longitudinal direction of the mobile object 17 in parallel therewith, an exemplary description is given with respect to the front camera 14 and the left side camera 16L. The boundary A between the side ditch and the road continues over the left side area LA (first area) of the mobile object 17 and the front area FA (second area) adjacent to the left side area LA.

Figure 5:
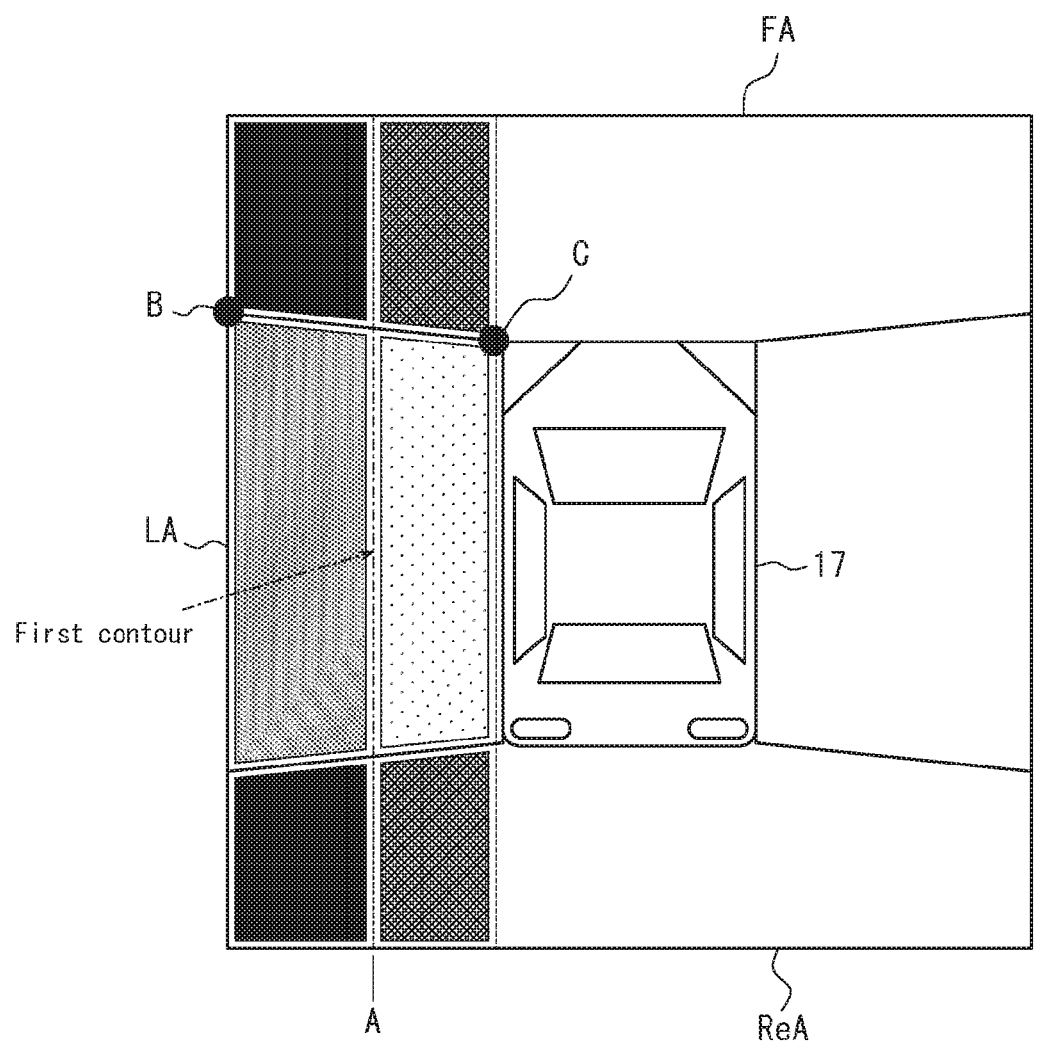
FIG. 5 is a diagram illustrating an example of a captured image in FIG. 4.

In the normal exposure control of a camera, the exposure is generally controlled so that the brightness of image is increased when the intensity of the light input from the object in the photometric area of the camera to the camera is small and the brightness of the image is decreased when the intensity of the light is large. For example, as illustrated in FIG. 5, since the left side camera 16L performs photometry in the shaded area, the whole image is adjusted to the appropriate brightness. On the other hand, since the front camera 14 performs photometry in the sunny area, the whole shaded area on the left side of the mobile object 17 is captured darkly.

Figure 6:
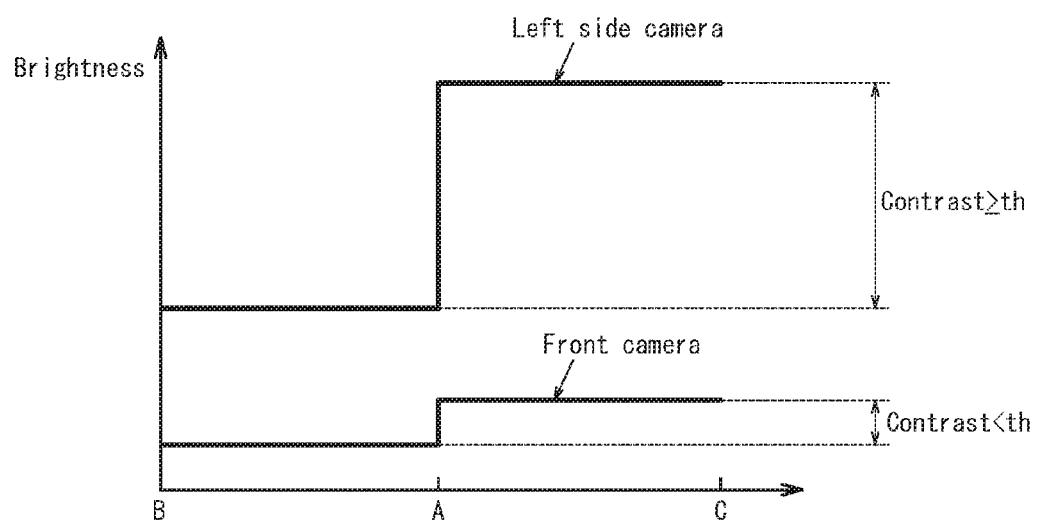
FIG. 6 is a diagram illustrating the brightness of the captured image in FIG. 5.

Here, the brightness of each image by the front camera 14 and the left side camera 16L can differ between the side ditch side and the road side of the boundary A. FIG. 6 illustrates the brightness of each of both images in the direction along the boundary between both images (see the line from B to C in FIG. 5). As illustrated in FIG. 6, the image by the left side camera 16L has a large contrast at the boundary A between the side ditch and the road (for example, the predetermined value, th, or more), and the visibility of the side ditch on the image is high. On the other hand, for the image by the front camera 14, the contrast at the boundary A is small (for example, less than the predetermined value, th), and the visibility of the side ditch on the image is low.

The image processing device 13 of this embodiment detects the boundary A between the road and the side ditch as the first contour on the image (first image) by the left side camera 16L that captures the left side area LA (first area). On the other hand, the second contour that has a contrast of the predetermined value, th, or more is not detected on the extension of the first contour, that is, on the boundary A between the side ditch and the road, on the image (second image) by the front camera 14 that captures an image of the front area FA (second area). In this case, since the first contour extends to the boundary with the second image (see the line from B to C in FIG. 5) on the first image, it is highly probable that the boundary A between the side ditch and the road is present extending from the first area to the second area. As a result, the image processing device 13 can determine that the side ditch is present in the second area.

Figure 7:
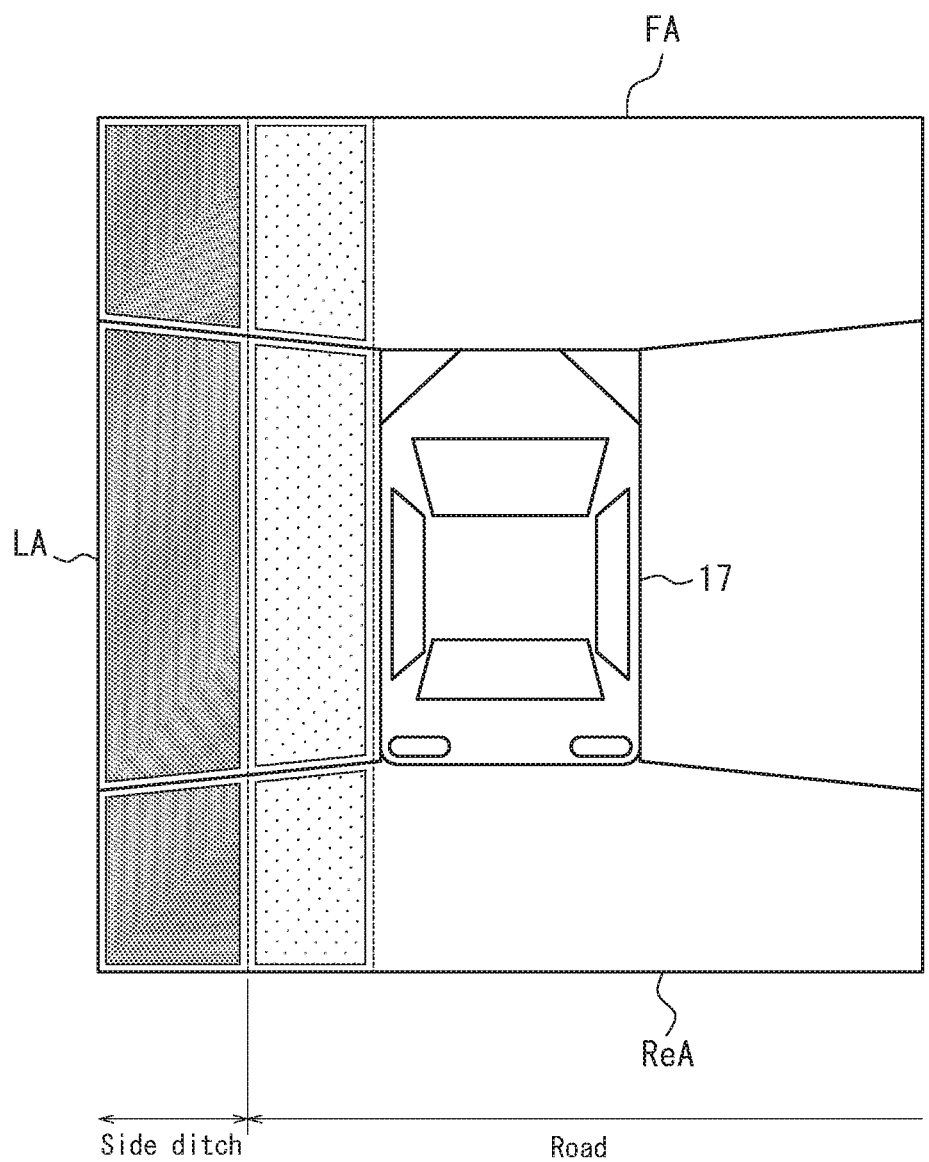
FIG. 7 is a diagram illustrating an example of a bird's eye image around the mobile object captured by the camera system in FIG. 1.

When the second contour that has a contrast of the predetermined value, th, or more is not detected, the contrast of the second image is increased, thus the image processing device 13 of this embodiment can improve the visibility of the object on the combined image displayed on the display device 12. For example, as illustrated in FIG. 4, when the side ditch and the shaded area are present around the mobile object 17, the contrast in the boundary A between the side ditch and the road on the image by the front camera 14 (and the rear camera 15) increases, and as a result, the visibility of the side ditch in the front area FA (and the rear area ReA) on the image is improved (see FIG. 7).

(Variation of the First Embodiment)

In the above described first embodiment, the front camera 14, the rear camera 15 and the side cameras 16L and 16R may respectively output the information indicating the setting relating to image capture via the car-mounted network 200, for example. Furthermore, the image processing device 13 may perform at least one of giving a warning to a driver based on the information acquired from the front camera 14, the rear camera 15 and the side cameras 16L and 16R and changing the setting relating to image capture by the front camera 14, the rear camera 15 and the side cameras 16L and 16R. The following gives greater details.

The front camera 14, the rear camera 15 and the side cameras 16L and 16R output, as the information indicating the setting of image capture, the information indicating a gain to be multiplied to an image signal in the gain control, for example.

The image acquiring unit 18 acquires the information indicating a gain output by the front camera 14, the rear camera 15 and the side cameras 16L and 16R.

The adjuster 21 compares the first gain set in the image capturing unit (14, 15, 16L, 16R) that captures a first image and the second gain set in the image capturing unit (14, 15, 16L, 16R) that captures a second image. The adjuster 21 may preferably compare the first gain set in the image capturing unit (14, 15, 16L, 16R) that captures the first image on which the first contour extending to the boundary with the second image is detected and the second gain set in the image capturing unit (14, 15, 16L, 16R) that captures the second image.

Subsequently, when the difference between the first gain and the second gain is the predetermined threshold or more, the adjuster 21 gives a warning to a driver. A warning may be given not only by the display via the display device 12, for example, but also by any means such as voice, vibration, or the like. When a warning is given by the display, a target area on the combined image displayed on the display device 12 may be displayed in a mode different from the normal mode. The target area may be, for example, at least some areas on the combined image where the first image and the second image are used, or an area indicating a boundary line between the first image and the second image on the combined image. The display in a mode different from the normal mode may be, for example, a highlighting display such as a flickering display, a superimposition display of a mark, or the like. When a warning is given by voice, a warning may be given by voice indicating the direction of the target area viewed from the mobile object 17. When the difference in gain relating to both pieces of information is large, it is highly probable that an obstacle cannot be recognized on an image captured by one of the image capturing units (14, 15, 16L, 16R), thus a driver's attention can be drawn by a warning.

Subsequently, when the difference between the first gain and the second gain is the predetermined threshold or more, the adjuster 21 changes the second gain in conformity to the first gain. As a result of this, for example, the value of the changed second gain is approximately the same as the value of the first gain. When the second contour having a contrast of the predetermined value, th, or more is not detected and the difference between the first gain and the second gain is the predetermined threshold or more, the adjuster 21 may preferably change the second gain in conformity to the first gain.

Then the adjuster 21 sets the changed second gain in the image capturing unit (14, 15, 16L, 16R) that captures a second image. As a result, the setting of a gain of the image capturing unit (14, 15, 16L, 16R) that captures a second image is approximately the same as the setting of a gain of the image capturing unit (14, 15, 16L, 16R) that captures a first image.

When there is a large difference in the setting relating to image capture between both image capturing units (14, 15, 16L, 16R) such as in the case where the difference between the gain of the image capturing unit (14, 15, 16L, 16R) that captures a first image and the gain of the image capturing unit (14, 15, 16L, 16R) that captures a second image is the predetermined threshold or more, it is highly probable that an object such as an obstacle cannot be recognized by one of the image capturing units (14, 15, 16L, 16R) on an image. In this case, according to the variation of the first embodiment, a driver's attention can be drawn by a warning. Furthermore, the setting relating to image capture by the image capturing unit (14, 15, 16L, 16R) that captures a second image is changed in conformity to the setting relating to image capture by the image capturing unit (14, 15, 16L, 16R) that captures a first image, and as a result the visibility of an object such as an obstacle commonly captured in the first image and the second image is improved.

In the above described variation, an example in which the adjuster 21 adjusts the setting of a gain as a setting relating to image capture is described. However, for example, the system may be configured so that the adjuster 21 adjusts the setting of a f-measure and a shutter speed of the optical system in the exposure control.

(Second Embodiment)

Next, the second embodiment of this disclosure is described. Although the configuration of the camera system 101 according to the second embodiment is the same as that of the first embodiment, the configuration of the image processing device is different.

Figure 8:
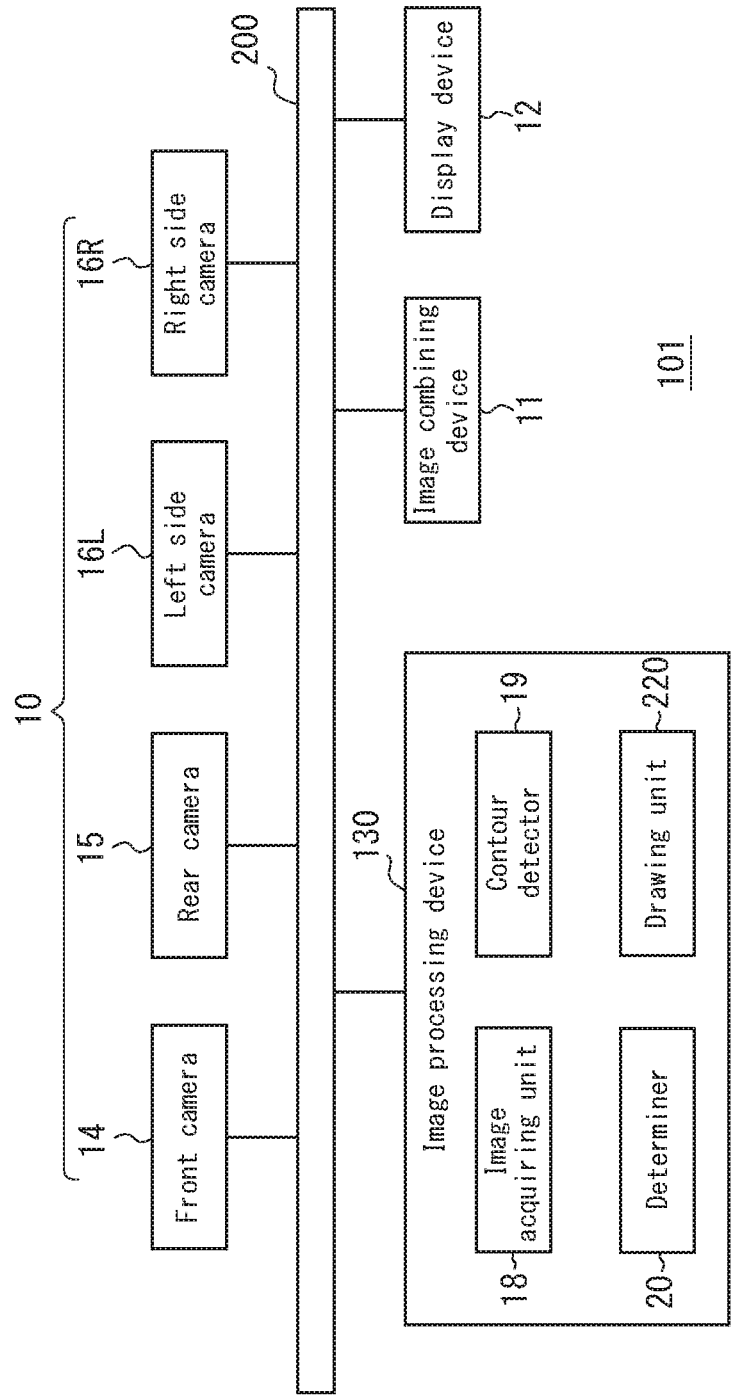
FIG. 8 is a functional block diagram illustrating a schematic configuration of a camera system according to a second embodiment of this disclosure.

As illustrated in FIG. 8, an image processing device 130 of this embodiment has an image acquiring unit 18, a contour detector 19, a determiner 20 and a drawing unit 220. The image acquiring unit 18, the contour detector 19 and the determiner 20 are the same as those of the first embodiment.

When a second contour having a contrast of the predetermined value, th, or more is not detected on a second image, the drawing unit 220 draws a display that improves the visibility of the object on the second image. For example, the drawing unit 220 draws a superimposed line on the position on the second image that corresponds to the extension of a first contour. Alternatively, the drawing unit 220 defines a position that corresponds to the extension of the first contour on the second image as a boundary and draws a color superimposed on an area far from the mobile object 17 on the second image, the color being different from the color of the area.

Figure 9:
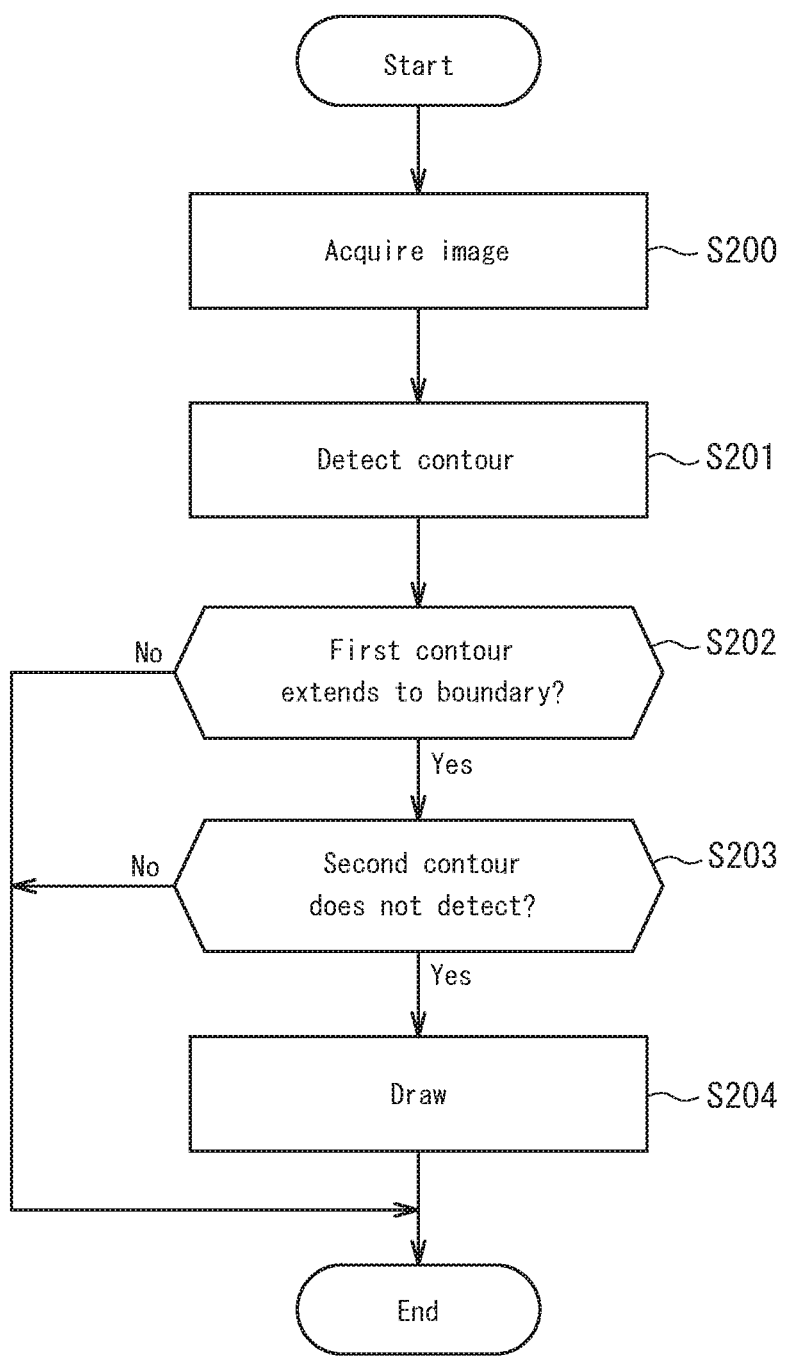
FIG. 9 is a flow chart illustrating an operation of an image processing device in FIG. 8.

Next, the operation executed by the image processing device 130 according to the second embodiment is described using the flow chart in FIG. 9.

The same processing as that of steps S100 through S103 (see FIG. 3) according to the first embodiment is performed at steps S200 through S203.

At step S203 (see FIG. 9), when a second contour is not detected (Yes at step S203), in step S204, the drawing unit 220 draws a display that improves the visibility of the object on the second image.

Steps S202 through S204 are performed with respect to all combinations of images that can be adopted as the first and second images.

As described above, the image processing device 130 of the second embodiment draws a display that improves the visibility of an object on the second image, and as a result, the visibility of the object can be improved on a combined image displayed on the display device 12 as illustrated below.

For example, as illustrated in FIG. 4, regarding the case where the boundary A between the side ditch and the road continues over the left side area LA (first area) and the front area FA (second area) adjacent to the left side area LA in the area around the mobile object 17, an exemplary description is given with respect to the front camera 14 and the left side camera 16L.

Figure 10:
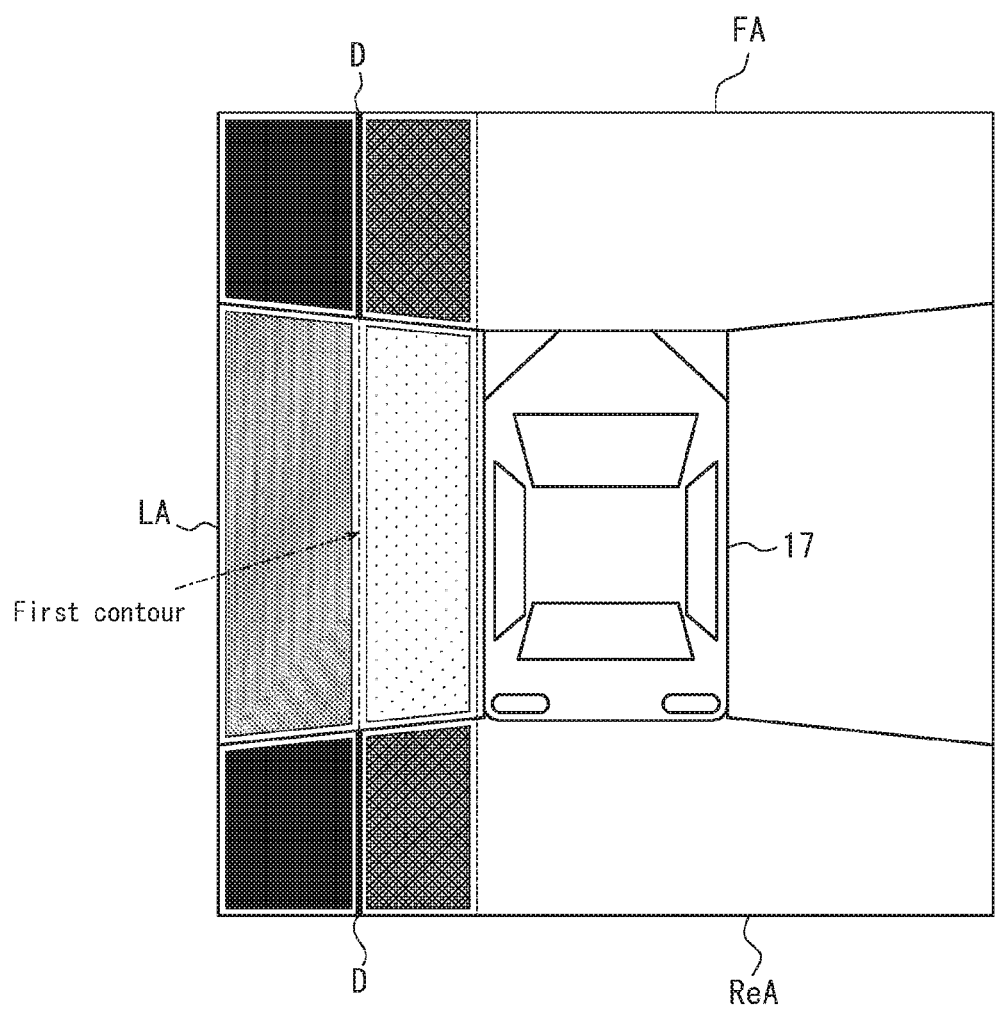
FIG. 10 is a diagram illustrating an example of a bird's eye image around the mobile object captured by the camera system in FIG. 8.
Figure 11:
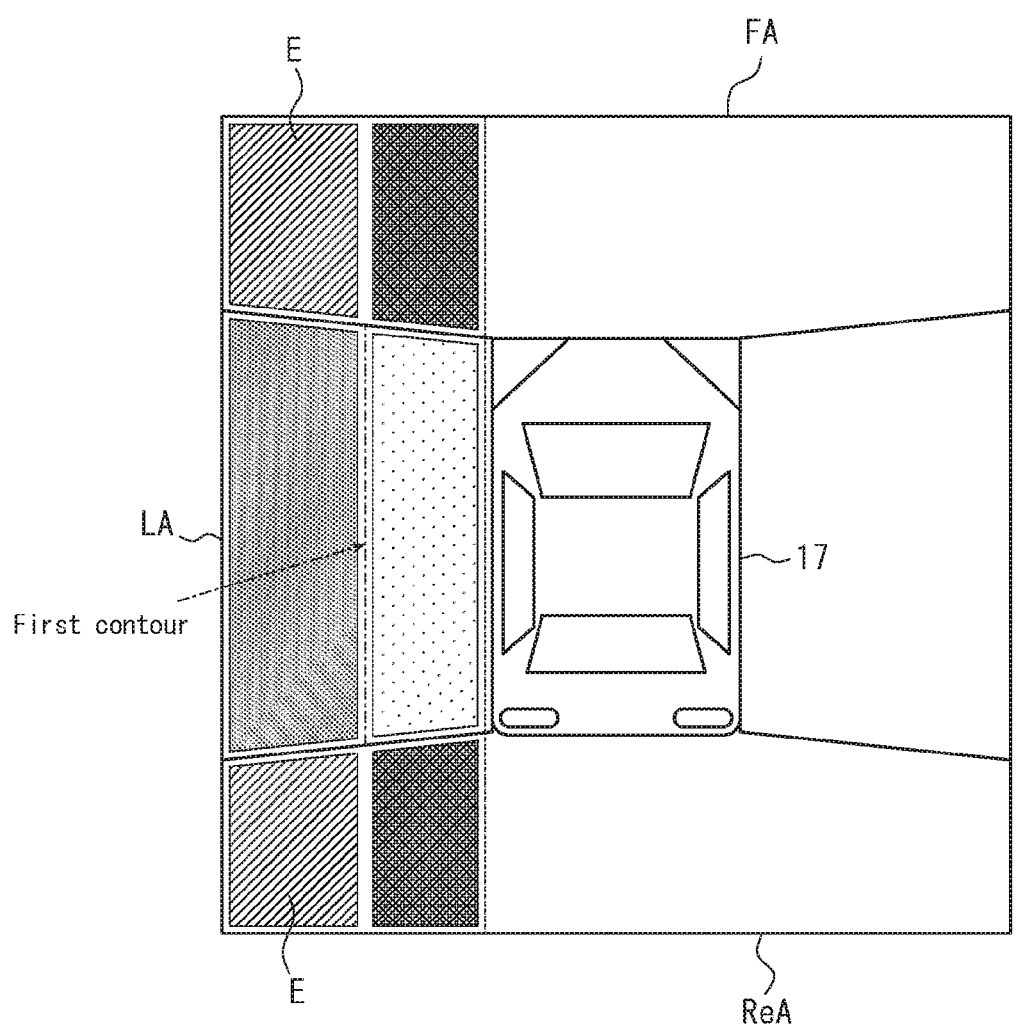
FIG. 11 is a diagram illustrating an example of the bird's eye image around the mobile object captured by the camera system in FIG. 8.

As illustrated in FIG. 10, the image processing device 130 draws a superimposed line D on a position on the image (second image) by the front camera 14 (and the rear camera 15) that corresponds to the extension of the first contour detected on the image (first image) by the left side camera 16L. Alternatively, as illustrated in FIG. 11, the image processing device 130 defines a position on the second image that corresponds to the extension of the first contour as a boundary line, and draws a color superimposed on the area E far from the mobile object 17 on the second image, the color being different from that of the area E. As a result of this, the visibility of the object (the boundary A between the side ditch and the road) can be improved on a combined image.

(Third Embodiment)

Figure 12:
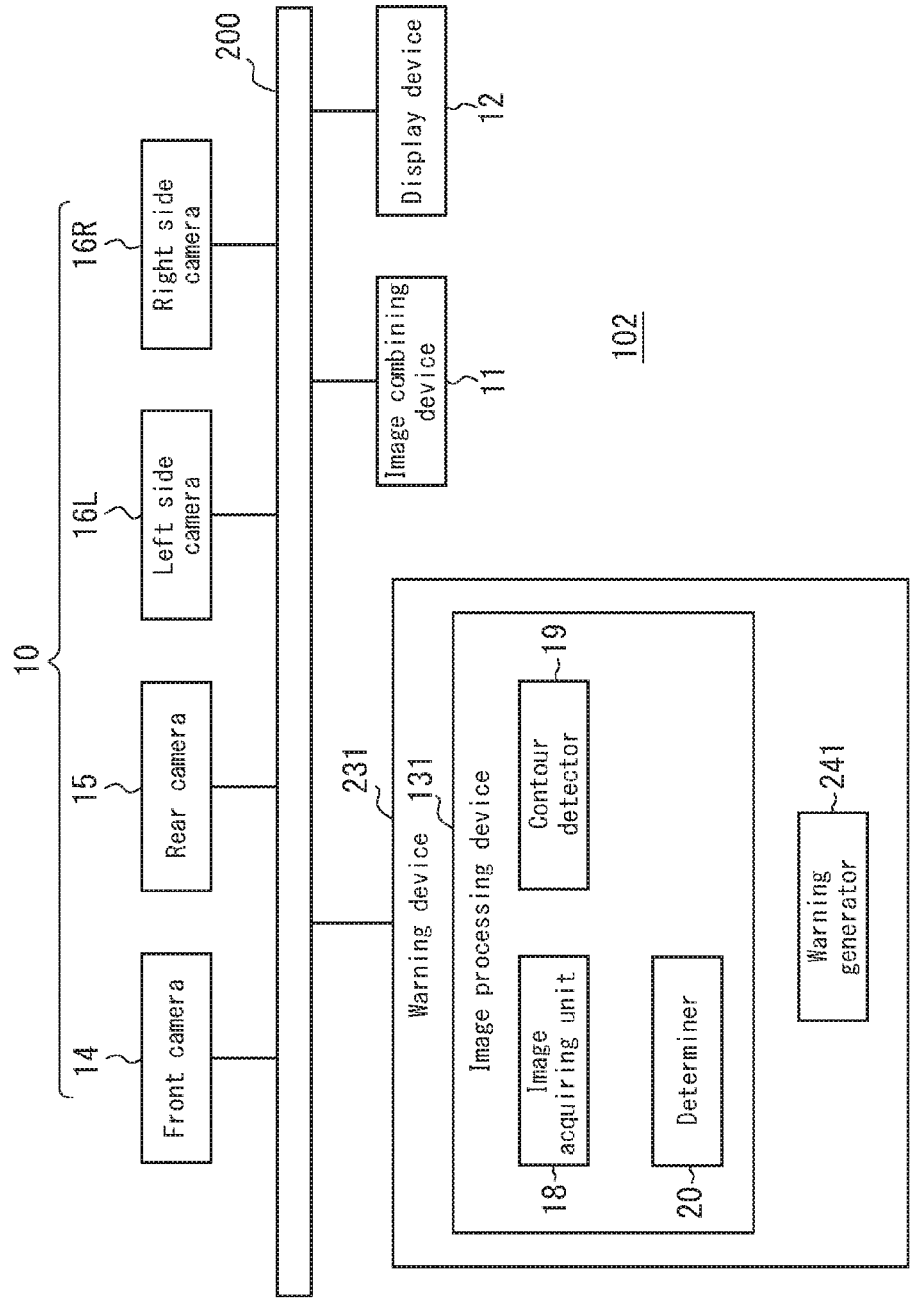
FIG. 12 is a functional block diagram illustrating a schematic configuration of a camera system according to a third embodiment of this disclosure.

Next, the third embodiment of this disclosure is described. As illustrated in FIG. 12, a camera system 102 according to the third embodiment includes a front camera 14, a rear camera 15, a left side camera 16L and a right side camera 16R, an image combining device 11, a display device 12 and a warning device 231. The front camera 14, the rear camera 15, the left side camera 16L, the right side camera 16R, the image combining device 11 and the display device 12 are the same as those of the first embodiment.

The warning device 231 includes an image processing device 131 that has an image acquiring unit 18, a contour detector 19 and a determiner 20 and a warning generator 241. The image acquiring unit 18, the contour detector 19 and the determiner 20 are the same as those of the first embodiment.

When a second contour having a contrast of the predetermined value, th, or more is not detected on a second image, the warning generator 241 gives a warning indicating a presence of an object (obstacle) with low visibility on a combined image. The warning is given by voice, for example. The warning may preferably indicate a presence of an object in the second area around the mobile object 17.

Figure 13:
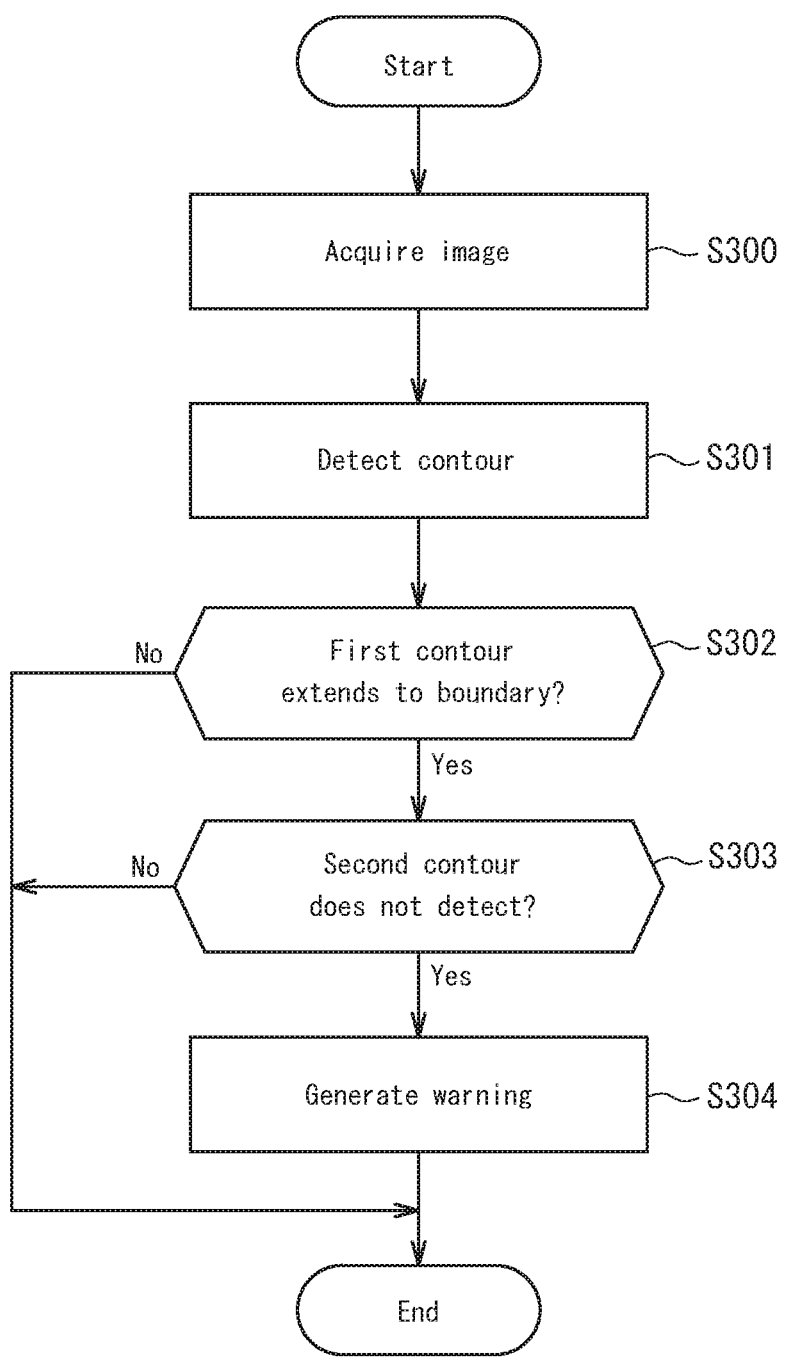
FIG. 13 is a flow chart illustrating an operation of an image processing device in FIG. 12.

Next, the operation executed by the warning device 231 according to the third embodiment is described using the flow chart in FIG. 13.

At steps S300 through S303, the same processing as that performed at steps S100 through S103 (see FIG. 3) in the first embodiment is performed.

When a second contour is not detected at step S303 (see FIG. 13) (Yes at step S203), in step S304, the warning generator 241 gives a warning indicating a presence of an object with low visibility on the image.

Steps S202 through S204 are executed for all combinations of images that can be adopted as the first and second images.

As described above, the warning device 231 of the third embodiment gives a warning indicating a presence of an object (obstacle) with low visibility on an image. For example, as illustrated in FIG. 4, when a side ditch is present around the mobile object 17, the warning device 231 gives a warning indicating a presence of an obstacle around the mobile object 17. The warning device 231 may preferably give a warning indicating that an obstacle is present in the second area, that is, the front area FA and the rear area ReA of the mobile object 17. As a result of this, a driver of the mobile object 17 can recognize a presence of an object with low visibility on a combined image displayed on the display device 12.

Although this disclosure has been described based on the drawings and the embodiments, it is to be noted that various changes and modifications will be easily made by those skilled in the art based on this disclosure. Therefore, such changes and modifications are to be understood as included within the scope of this disclosure.

For example, in the above described embodiments, although the image capturing device 10 includes the front camera 14, the rear camera 15, the left side camera 16L and the right side camera 16R, it may include more cameras. For example, a distant view camera that can capture an image of complete surrounding of the mobile object 17 may further be provided.

Furthermore, each function and each component of the camera system 100, 101 and 102 of the above described embodiments can be divided or rearranged. For example, the image processing device 13, 130, 131 may be provided to the front camera 14, or the like. Moreover, for example, a navigation system may further be provided, and the image processing device 13, 130, 131 may be provided to the navigation system.

In the above described second embodiment, the area on which the image processing device 130 draws a color superimposed thereon can be an area close to the mobile object 17 of the boundary line. That is, the image processing device 130 may draw a color superimposed on at least one area of the areas on the second image divided by the boundary line, the color being different from that of the area.

Furthermore, the above described embodiments can be executed by combining each other. For example, each image processing device 13, 130, 131 may be configured to include both the adjuster 21 and the drawing unit 220. Moreover, the image processing device 131 included in the warning device 231 may have the adjuster 21 and the drawing unit 220.

Furthermore, a part of the components of the camera systems 100, 101 and 102 according to the above described embodiments may be provided outside the mobile object 17. For example, the image processing device 13, 130, 131 and the image combining device 11 or the like may be implemented as a communication device such as a cell phone, an external server, or the like, and may be connected to the other components of each camera system 100, 101 and 102 wired or wirelessly.

REFERENCE SIGNS LIST

10 Image capturing device
11 Image combining device
12 Display device
13, 130, 131 Image processing device
14 Front camera
15 Rear camera
16L Left side camera
16R Right side camera
17 Mobile object
18 Image acquiring unit
19 Contour detector
20 Determiner
21 Adjuster
100, 101, 102 Camera system
200 Car-mounted network
220 Drawing unit
231 Warning device
241 Warning generator

The invention claimed is:

1. An image processing device, comprising:
a processor configured to execute functions of:
an image acquiring unit configured to acquire a first image capturing an area around a mobile object including a first area and a second image capturing an area around the mobile object including a second area adjacent to the first area;
a contour detector configured to perform a contour detection to the first and second images;
a determiner configured to determine, if a first contour detected on the first image extends to a boundary with the second image on a combined image including at least a part of the first image and at least a part of the second image, whether or not a second contour is detected on an extension of the first contour on the second image; and
an adjuster configured to make an adjustment to increase a contrast of the second image if the determiner determines that the second contour is not detected on the second image.

2. The image processing device according to claim 1, wherein the adjustment is made by at least one of brightness correction, color correction and contour correction of the second image, exposure control when capturing and gain control when capturing.

3. The image processing device according to claim 1,
wherein the image acquiring unit acquires information indicating a first gain set in a first image capturing unit that captures the first image and information indicating a second gain set in a second image capturing unit that captures the second image; and
if a difference between the first gain and the second gain is a threshold or more, the adjuster performs at least one of giving a warning to a driver and setting the second gain that has been changed in conformity to the first gain in the second image capturing unit.

4. An image processing device, comprising:
a processor configured to execute functions of:
an image acquiring unit configured to acquire a first image capturing an area around a mobile object including a first area and a second image capturing an area around the mobile object including a second area adjacent to the first area;
a contour detector configured to perform a contour detection to the first and second images;
a determiner configured to determine, if a first contour detected on the first image extends to a boundary with the second image on a combined image including at least a part of the first image and at least a part of the second image, whether or not a second contour is detected on an extension of the first contour on the second image; and
a drawing unit configured to draw a superimposed line at a position on the second image that corresponds to the extension of the first contour if the determiner determines that the second contour is not detected on the second image.

5. An image processing device, comprising:
a processor configured to execute functions of:
an image acquiring unit configured to acquire a first image capturing an area around a mobile object including a first area and a second image capturing an area around the mobile object including a second area adjacent to the first area;
a contour detector configured to perform a contour detection to the first and second images;
a determiner configured to determine, if a first contour detected on the first image extends to a boundary with the second image on a combined image including at least a part of the first image and at least a part of the second image, whether or not a second contour is detected on an extension of the first contour on the second image; and
a drawing unit configured to define a position on the second image that corresponds to the extension of the first contour as a boundary line if the determiner determines that the second contour is not detected on the second image, and to superimpose, on at least one area of areas on the second image divided by the boundary line, a color that is different from a color of the area.

6. A warning device, comprising:
a processor configured to execute functions of:
an image acquiring unit configured to acquire a first image capturing an area around a mobile object including a first area and a second image capturing an area around the mobile object including a second area adjacent to the first area;
a contour detector configured to perform a contour detection to the first and second images;
a determiner configured to determine, if a first contour detected on the first image extends to a boundary with the second image on a combined image including at least a part of the first image and at least a part of the second image, whether or not a second contour is detected on an extension of the first contour on the second image;
an adjuster configured to make an adjustment to increase a contrast of the second image if the determiner determines that the second contour is not detected on the second image; and
a warning generator configured to give a warning indicating that an obstacle is present if the determiner determines that the second contour is not detected on the second image.

7. A method for processing an image, comprising the steps of:
acquiring a first image capturing an area around a mobile object including a first area and a second image capturing an area around the mobile object including a second area adjacent to the first area;
performing a contour detection to the first and second images;
determining, if a first contour detected on the first image extends to a boundary with the second image on a combined image generated by using the first and second images, whether or not the second contour is detected on an extension of the first contour on the second image; and
making an adjustment to increase a contrast of the second image if it is determined that the second contour is not detected on the second image.

8. A method for processing an image, comprising the steps of:
acquiring a first image capturing an area around a mobile object including a first area and a second image capturing an area around the mobile object including a second area adjacent to the first area;
performing a contour detection to the first and second images;
determining, if a first contour detected on the first image extends to a boundary with the second image on a combined image generated by using the first and second images, whether or not the second contour is detected on an extension of the first contour on the second image; and
drawing a superimposed line at a position on the second image that corresponds to the extension of the first contour if it is determined that the second contour is not detected on the second image.

9. A method for processing an image, comprising the steps of:
acquiring a first image capturing an area around a mobile object including a first area and a second image capturing an area around the mobile object including a second area adjacent to the first area;
performing a contour detection to the first and second images;
determining, if a first contour detected on the first image extends to a boundary with the second image on a combined image generated by using the first and second images, whether or not the second contour is detected on an extension of the first contour on the second image; and defining a position on the second image that corresponds to the extension of the first contour as a boundary line if it is determined that the second contour is not detected on the second image, and to superimpose, on at least one area of areas on the second image divided by the boundary line, a color that is different from a color of the area.

* * * * *